Oct. 22, 1935.  L. C. E. MILLY  2,018,564

HINGE WITH HYDRAULIC BRAKE

Filed March 30, 1933

Inventor,
Lucien C. E. Milly.

By William C. Linton.
Attorney.

Patented Oct. 22, 1935

2,018,564

UNITED STATES PATENT OFFICE 2,018,564

HINGE WITH HYDRAULIC BRAKE

Lucien Charles Eugène Milly, Paris, France

Application March 30, 1933, Serial No. 663,629
In France March 30, 1932

3 Claims. (Cl. 16—84)

The invention has for its object a device to brake and make silent the shutting of the swinging doors, and the shutting of which is automatic, for instance, by using spring hinges with a single or double action.

The device includes essentially a core loosely revolving within a cylindrical sleeve; the axis of the said core coincides with the rotation axis of the door, but is eccentric in relation to the sleeve axis. The room thus formed around the core, limited at its upper and lower parts by two bearings, is divided into two chambers of a variable capacity by a spring steel blade fastened to the core, and the highly resilient lips of which provide at the right moment the wanted tightness. A permanent communication between the two chambers is had by means of a channel closed by a screw operated from outside.

Figure 1:
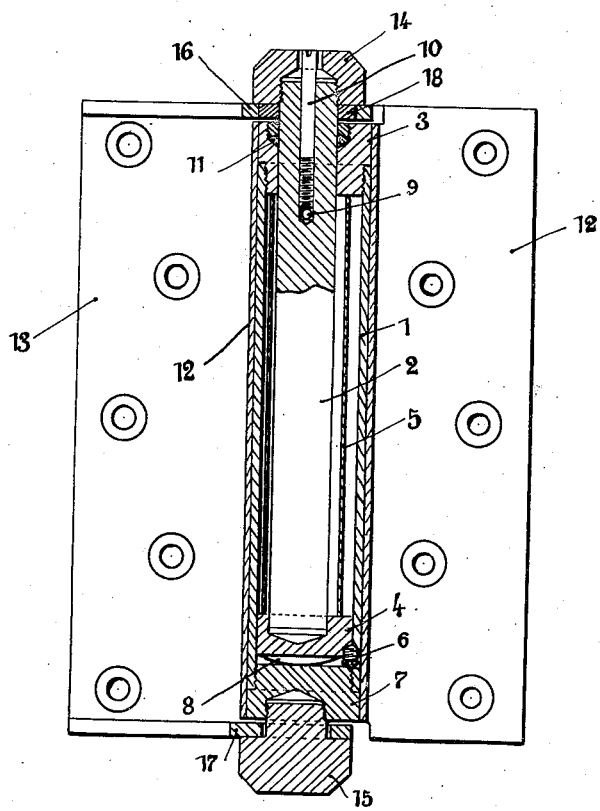
Figure 1 is a front elevation of the hinge when in opened position having a portion thereof in section.
Figure 2:
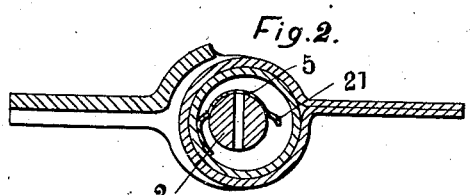
Figure 2 is a horizontal section through the same.

The hinge includes a cylinder 1 containing a cylindrical core 2, the rotation of which between two bearings 3 and 4 drives a steel blade 5 constituting a flexible partition the profile of which enables resilient deformations of the edges in the relative positions of the core to which it is bound and of the cylinder surrounding the said core. A bearing 4 is made solidary with the cylinder 1 by means of a key 6. A plug 7 is affixed to the cylinder 1 by screw-threads and produces by the compression of an elastic washer 8 a tight contact between the ends of the blade 5 and the bearings 3 and 4.

Figure 3:
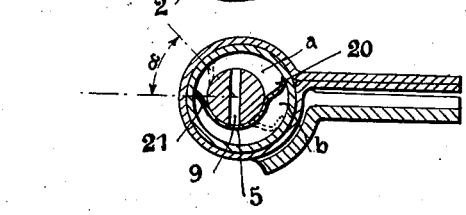
Figure 3 is a similar section when the hinge is in a closed position.
Figure 4:
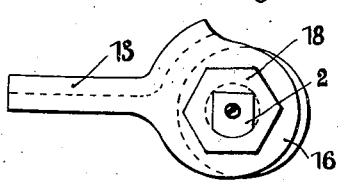
Figure 4 is a plan view of the hinge when in another closed position with a connecting nut removed.

The room between the cylinder 1 and the core 2, filled with a suitable oil, is divided into two chambers by the blade 5 which forms a partition as shown in Figure 3, a communication between the chambers $a$ and $b$ being obtained by a channel 9 the section of which is adjusted by means of a screw 10.

The plug-shaped bearing 3 also is made solidary with the cylinder 1 by screw-threads; it includes a stuffing-box 11 affording a tight connection. A rolled iron sheet casing 12, rigidly secured to the cylinder 1, constitutes one of the hinge plates, and the other plate is made solidary with the core 2 by its upper lug 16 on which a pressure is exerted by the nut 14. A plate 18 rigid with the core is fixedly engaged into a suitably shaped cut of the lug 16. The lower lug 17 is loosely mounted to revolve on the screw 15.

Figure 5:
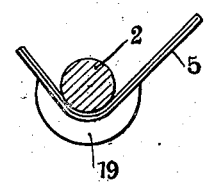
Figure 5 is a detail view of a slightly modified form of the invention.

In the slightly modified form of the invention as shown in Figure 5, the blade 5 is of a laminated construction and its medial portion together with the profiled member 19 are soldered or in any other manner secured to the core 2. This profiled member 19 extends throughout the entire height of the blade 5 and normally tends to retain the opposed sides of the blade in the positions as shown. When this blade is placed within the cylinder 1 the profiled member normally holds the opposed sides of the blade in opened position or a position where the edges thereof will be caused to extend towards the inner wall of the cylinder 1.

In using the hinge, the plate 12 is fastened in the rabbet of the door frame, and the other plate 13 on the edge of the door (or inversely according to the opening direction), so that the adjusting screw 10 is at the top.

By opening the door the position of the hinge when the door is closed being as shown in Figure 3, the pressure created within the chamber $b$ compels the edges 20 and 21 of the blade 5 to move away from the inside wall of the cylinder 1, thus making a temporary communication between the chambers $a$ and $b$, so that the oil compressed into chamber $b$ is allowed to enter into chamber $a$ without any resistance to the rotation, and this action continues until the angular displacement equals angle $\alpha$ as shown in Fig. 3 of the drawing beyond which a new temporary communication is established by means of the edge 21 separating from the wall of the cylinder 1; the edge 20 then coming into contact with the cylinder 1, and the opening of the door reaching in that way its maximum, that is 180° without any abnormal effort. At this moment, the door being left free to come back, for instance, by the operation of springs or a spring combination independent of this invention, is quickly shut until the edge 21 of the blade 5 again contacts the inside wall of the cylinder 1, in the position shown by dotted lines in Fig. 3. There is now no more temporary communication between the two chambers $a$ and $b$, the compression created within the chamber $a$ brings resilient deformations in the blade 5 with a tendency to tighten the contact between the edges 20 and 21 of the said blade and the inside wall of the cylinder. Such deformations further enable to obtain the required pressure in the brake effect balancing the said elastic deformations progressively and without any shock. At this precise moment only the channel 9 more or less closed by the screw 10 allows the oil to pass from chamber $a$ to chamber $b$, the rotation being thus slackened at will until the door is fully shut.

The above described device is also used for the double acting hinges.

Having now described the object of this invention and in which manner same is to be performed, what I claim is:

1. A hydraulic hinge comprising a cylinder, means for attaching said cylinder to a door, casing, a spindle movably and eccentrically mounted within said cylinder, a resilient blade secured to said spindle to move therewith and disposed to form variable compression chambers within said cylinder, plug shaped bearings closing the extremities of said cylinder and guiding the spindle and means connected to the spindle for moving the same with the displacement of the door.

2. A hydraulic hinge comprising a cylinder, means for attaching said cylinder to a door, a spindle movably and eccentrically mounted within said cylinder, a resilient blade secured to said spindle to move therewith and disposed to form variable compression chambers within and throughout the length of said cylinder, plug shaped bearings closing said cylinder and guiding the spindle in its movements following the displacement of the door, and means in said spindle establishing communication between the compression chambers defined by said blade.

3. A hydraulic hinge comprising a relatively fixed cylinder, a spindle movably and eccentrically mounted within said cylinder and having a resilient blade disposed to sub-divide said cylinder into a pair of compression chambers throughout the length of said cylinder, means for closing the cylinder and guiding the spindle, means to cause the movement of the spindle upon the displacement of the door whereby to displace one edge of the spindle blade to and away from the adjacent surface of the cylinder, and means formed in said spindle and establishing communication between said chambers.

LUCIEN CHARLES EUGÈNE MILLY.